United States Patent [19]

Nojiri et al.

[11] Patent Number: 5,065,353
[45] Date of Patent: Nov. 12, 1991

[54] ADDER CONTROL METHOD AND ADDER CONTROL CIRCUIT

[75] Inventors: Tohru Nojiri, Tokyo; Masahiro Kainaga, Yokohama, both of Japan

[73] Assignee: Hitachi, Ltd., Tokyo, Japan

[21] Appl. No.: 500,467

[22] Filed: Mar. 28, 1990

[30] Foreign Application Priority Data

Mar. 31, 1989 [JP] Japan .................................. 1-082333

[51] Int. Cl.$^5$ ........................................ G06F 7/50
[52] U.S. Cl. ................................................ 364/786
[58] Field of Search ................................. 364/786, 784

[56] References Cited

U.S. PATENT DOCUMENTS

| | | | |
|---|---|---|---|
| 3,932,734 | 1/1976 | Parsons | 364/786 |
| 4,357,675 | 11/1982 | Freyman | 364/786 |
| 4,536,855 | 8/1985 | Morton | 364/786 |
| 4,683,548 | 7/1987 | Mlynek | 364/786 |
| 4,887,233 | 12/1989 | Cash et al. | 364/784 X |

FOREIGN PATENT DOCUMENTS

53-121532 10/1978 Japan .................................. 364/784

OTHER PUBLICATIONS

Computer Architecture and Organization, 1978, J. P. Hayes, pp. 171–179.

*Primary Examiner*—Gary V. Harkcom
*Assistant Examiner*—Tan V. Mai
*Attorney, Agent, or Firm*—Fay, Sharpe, Beall, Fagan, Minnich & McKee

[57] ABSTRACT

In an adder control circuit, a plurality of full adders are so arranged that a carry bit of the full adder for calculating low orders of values to be added is inputted to the full adder for calculating high orders thereof. In this case, the addresses are controlled in response to a clock having a time period which is more than a maximum calculation time period among calculation time periods by the respective full adders required for outputting the carry bits, and is less than a total calculation time period of all full adders.

16 Claims, 4 Drawing Sheets

ADDER CONTROL METHOD AND ADDER CONTROL CIRCUIT

BACKGROUND OF THE INVENTION

The present invention generally relates to an adder control method and a circuit thereof. More specifically, the present invention is directed to a control method for an adder circuit constructed of a calculator employed in a computer, and also to a circuit thereof to which the present invention is suitably applied.

A conventional adder circuit and control method thereof, is described in detailed in "Computer Architecture and Organization" by J. P. Hayes, in 1978, published by McGraw-Hill Inc. on pages 171 to 178.

In accordance with the above-described prior art, the adder circuit is realized by employing a ripple carry adder as a basic construction. An n-bit ripple carry adder is arranged by series-connecting n adders with respect to input/output lines for a carry (which will be called "a carry chain"). Each of the full adders supplies a carry bit to an adjacent full adder. When a full adder receives a carry bit from its adjoining full adder then it can output a value of its carry bit and a result bit from its two bits 2-input data and its received carry bits.

Such a condition that the carry bit is sequentially supplied and received from LSB (least Significant Bit) to MSB (Most Significant Bit) in the carry chain is referred to as "a carry propagation". A time period required for performing an n-bit addition with employment of this adder is determined by:

"nd", where "d" is the propagation delay of one full adder, i.e., the time period required in the slowest full adder from the time of receipt of the rele.ant bit and the value of the carry bit based upon the relevant bit of the 2-input data and the received carry bit until the time of output of the carry bit to the adjacent full adder.

In the conventional technique, the system clock is set in such a manner that the process of this adder is completed within 1 clock cycle. As a consequence, the time period of the system clock for controlling the computer system including this adder must be selected to be longer than "nd".

Furthermore, there is a carry-lookahead adder to implement a high-speed process in an adder by reducing a time delay associated with carry bit propagation. This carry-lookahead adder does not add two inputs X and Y for every 1 bit, but produces a result Z as follows. That is to say, the two inputs X and Y are divided into a plurality of portions constructed of $X(i)$ and $Y(i)$; $X(i)$, $Y(i)$ and $C(i-1)$ are inputted every m bits; addition operations are successively performed so as to produce a result $Z(i)$ and carry bit $C(i)$, whereby the result Z is produced.

The above-described prior art has such a problem that no care is taken to bit widths of the data and address in the computer systems being expanded from 32 bits to 48 bits, 64 bits or more higher bits. Then, when the bit widths are further expanded, the length of the carry chain of the adder is extended and accordingly and also the time period of the system clock for controlling the computer system is extended.

Even when the above-described carry-lookahead adder is employed to solve this conventional problem, the carry chain is expanded under such a condition that both the number of bits of the data and address are increased. Moreover, it makes the entire circuit complex to increase the number of carry-lookahead bits, so that there is a critical path in the adder circuit, therefore this look ahead solution cannot essentially solve the above-described problem of a ripple carry.

Furthermore, the above-described prior art has another problem as follows. That is, no care is taken to the chacteristics of the program such that there are many cases where one of two input data to be added with each other is a value capable of being indicated by a less bit number. In most addition processes, the value of the result has been defined in the middle of 1 clock cycle, and therefore the addition process by the computer system consumes useless time.

SUMMARY OF THE INVENTION

An object of the present invention is to provide an adder control method as well as a circuit thereof capable of preventing expansion of a time period of a clock for controlling a computer system even when the number of bits of data and an address in the computer system is increased.

Another object of the present invention is to provide an adder control method and a circuit thereof 10 which can omit a useless time consumed in the conventional addition process, taking account of such a characteristic of a program that there are many cases where one of two input data an addition process, e.g. updating a program counter and a stack pointer, is so small as to be represented by a smaller bit number.

Other objects and aspects of the invention will become apparent from the following description of embodiments with reference to the accompanying drawings.

The above-described objects of the present invention may be achieved as follows.

That is to say, two-n-bit values X and Y are employed as an input and the two n-bit values are divided into a plurality of portions constructed of $n(i)$-bit values $X(i)$ and $Y(i)$ (where $i>0$, and the LSB is contained in $X(l)$ and $\&(l)$). Both $n(i)$-bit values $X(i)$ $\&(i)$ and a carry bit $C(i-1)$ are processed by a full adder computation (where initial carry bit $C(0)=(0)$ so as to produce a result $Z(i)$ and a carry bit $C(i)$. All $Z(i)$ are concatenated as an n-bit result value Z. In such an adder, there is a time period required for inputting $n(i)$-bit values $X(i)$ and $Y(i)$ and carry bit $C(i-1)$, producing both said result $Z(i)$ and carry bit $C(i)$ and outputting result $Z(i)$ and carry bit $C(i)$ to an adjacent address. The processes of the adders for respective divided portions are controlled in such a manner that the longest time period among the time periods for the plurality of divided portions is emPloyed as a time period of a clock for the adder.

Furthermore, addition processes for updating a program counter and a stack pointer are implemented by the above-described adder control method, or control circuit thereof.

With the above-described arrangements, the objects of the present invention may be achieved.

In an adder control method and a control circuit thereof according to the present invention, two n-bit values X and Y are employed as an input, the two n-bit values are divided into a plurality of portions constructed of $n(i)$-bit values $X(i)$ and $Y(i)$ (where $i>0$, LSB is contained in $X(l)$ and $Y(l)$, both the $X(i)$, $Y(i)$ and C(i−1) are processed by a full adder computation (where the initial carry C(0)=0) so as to produce a result z(i) and a carry bit C(i), and to output an n-bit number Z which is a concatenation of all Z(i). That is to say, an exclusive OR-gating and an AND-gating are carried out with respect to all of values X(i) and Y(i) in a first cycle, whereby these results are equal to z(i) and g(i) respectively. At the same time, it is assumed that Z(1)=z(1), and C(1)=g(1). Subsequently, Z(i) and C(i) are sequentially defined based upon z(i), g(i) and C(i−1) in an i-th cycle.

In case that the carry bit C(i) is equal to "0" with respect to all of i≧j in a certain j cycle, Z(i)=z(i) (where i>j) in a (j+1)-th cycle and all of Z(i) are concatenated so as to output an n-bit value Z as an output.

As a result, since the n-bit number Z is made as a result value, no error operation occurs. Other detailed operations will be described in the descriptions of the preferred embodiments.

DESCRIPTION OF THE PREFERRED EMBODIMENT

Referring now to figures, preferred embodiments according to the present invention will be described in detail.

Figure 1:
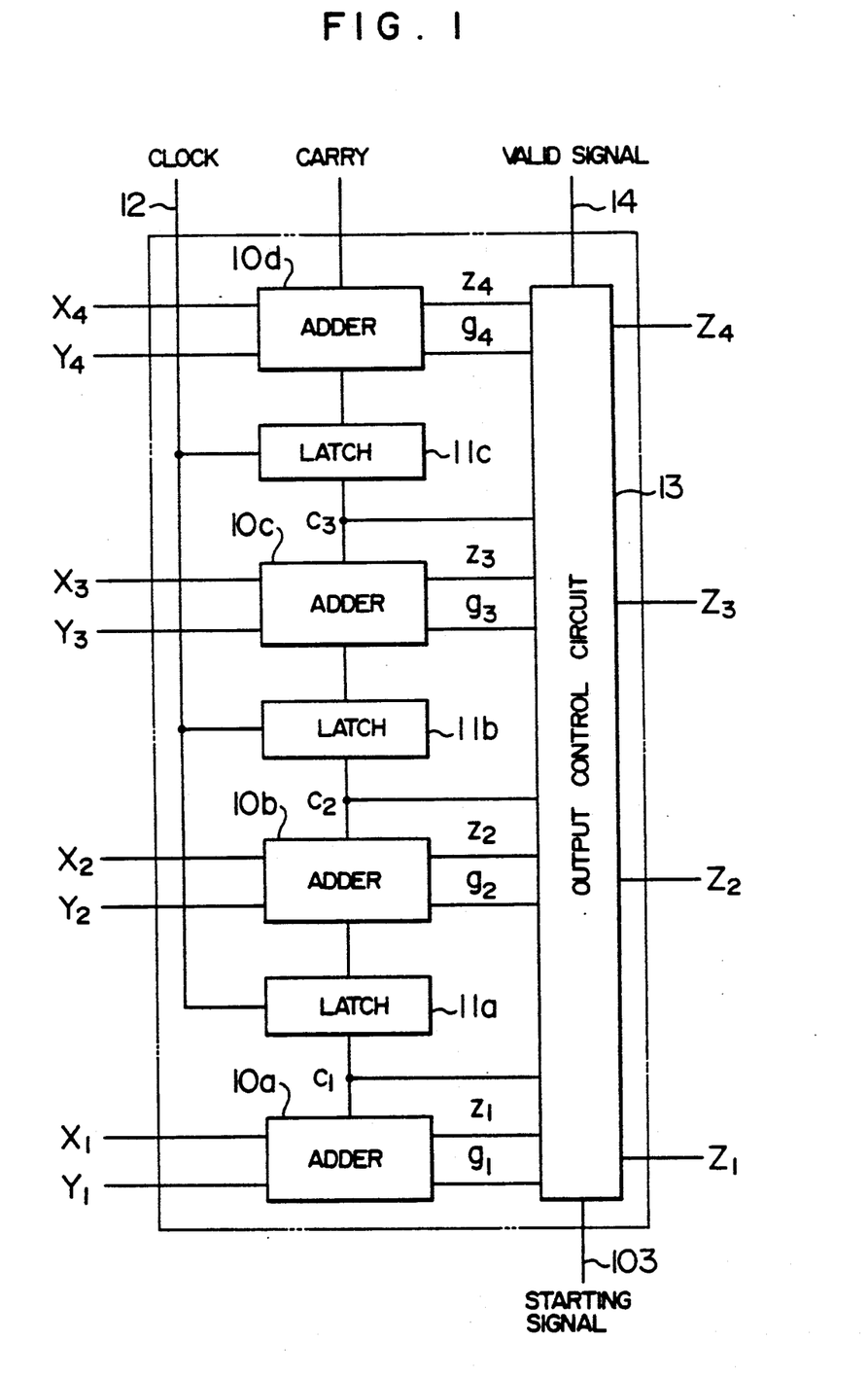
FIG. 1 is a schematic block diagram for representing an arrangement of an adder according to a preferred embodiment of the present invention.

FIG. 1 is a schematic block diagram of a 64-bit adder according to one preferred embodiment of the present invention. The adder according to the preferred embodiment outputs a 64-bit number as Z when 64-bit numbers of X and Y are inputted.

The adder according to the preferred embodiment is constructed of four 16-bit adders $10a$ to $10d$, three latches $11a$ to $11c$ under the control of a clock signal 12, and an output timing control circuit 13. In the 64-bit adder, both 64-bit numbers of X and Y are subdivided into 16-bit numbers of $X_4, X_3, X_2, X_1$ and $Y_4, Y_3, Y_2, Y_1$, which are then processed respectively in a 16-bit unit by the 16-bit adders $10d$, $10c$, $10b$ and $10a$.

Transfer of carry signals $C_1$, $C_2$ and $C_3$ between the adders $10d$, $10c$, $10b$ and $10a$ is controlled by the three latches $11a$, $11b$ and $11c$ under the control of the clock signal 12. That is to say, the carry values which have been inputted into the latches are held at the output side in response until a rising edge of a next clock to a falling edge of a clock in response to a In response to a rising edge of a clock first cycle at which an addition process is commenced, the values of the three latches $11a$, $11b$ and $11c$ are set to 0, and both the inputs $X_4, X_3, X_2, X_1$ and $Y_4, Y_3, Y_2, Y_1$ become effective values. The addition processes are commenced in the respective adders $10d$, $10c$, $10b$ and $10a$, and values of $z_4, z_3, z_2, z_1, g_4, g_3, g_2, g_1, C_1, C_2$ and $C_3$ are fixed.

It should be noted that $Z_i$ is equal to an exclusive OR-gated $X_i$, $Y_i$ and $C_{i-1}$, whereas $g_i$ is equal to an AND-gated $X_i$ and $Y_i$. Since the signal transfer or propagation of the carry signals $C_1$, $C_2$ and $C_3$ is controlled by the three latches $11a$, $11b$ and $11c$ under the control of the clock signal 12, the value of $C_{i-1}$ is defined as a value with respect to the inputs X and Y from the falling edge of the clock i−1 cycle until the rising edge of the clock in the i-th cycle. As a result, $Z_i$ is defined as a value with respect to the inputs X and Y from the falling edge of the clock in the i cycle until the rising edge of the clock in the (i+1)th cycle.

Here, if $C_{j-1}$ is equal to 0 and $g_i$ (note: all of i≧j) is equal to 0, Ci (note: all of i≧j) becomes 0 inductively. As a consequence, at this time, namely at the rising edge of the clock in the j-th cycle, the values of z4, z3, z2 and z1 are fixed as values of $Z_4, Z_3, Z_2$ and $Z_1$ with respect to the added result Z for the inputs X and Y. Then, it is not required to continue the process until the rising edge of the clock in the fifth cycle.

A valid signal 14 indicates that the above-described values z4, z3, z2 and z1 have been fixed as the values of $Z_4, Z_3, Z_2$ and $Z_1$ with respect to the added result Z for the inputs X and Y. An output timing control circuit 13 has such a function to produce both the valid signal 14 and added results $Z_4, Z_3, Z_2, Z_1$ based upon the values of $g_4, g_3, g_2, g_1, C_1, C_2$ and $C_3$.

Figure 2:
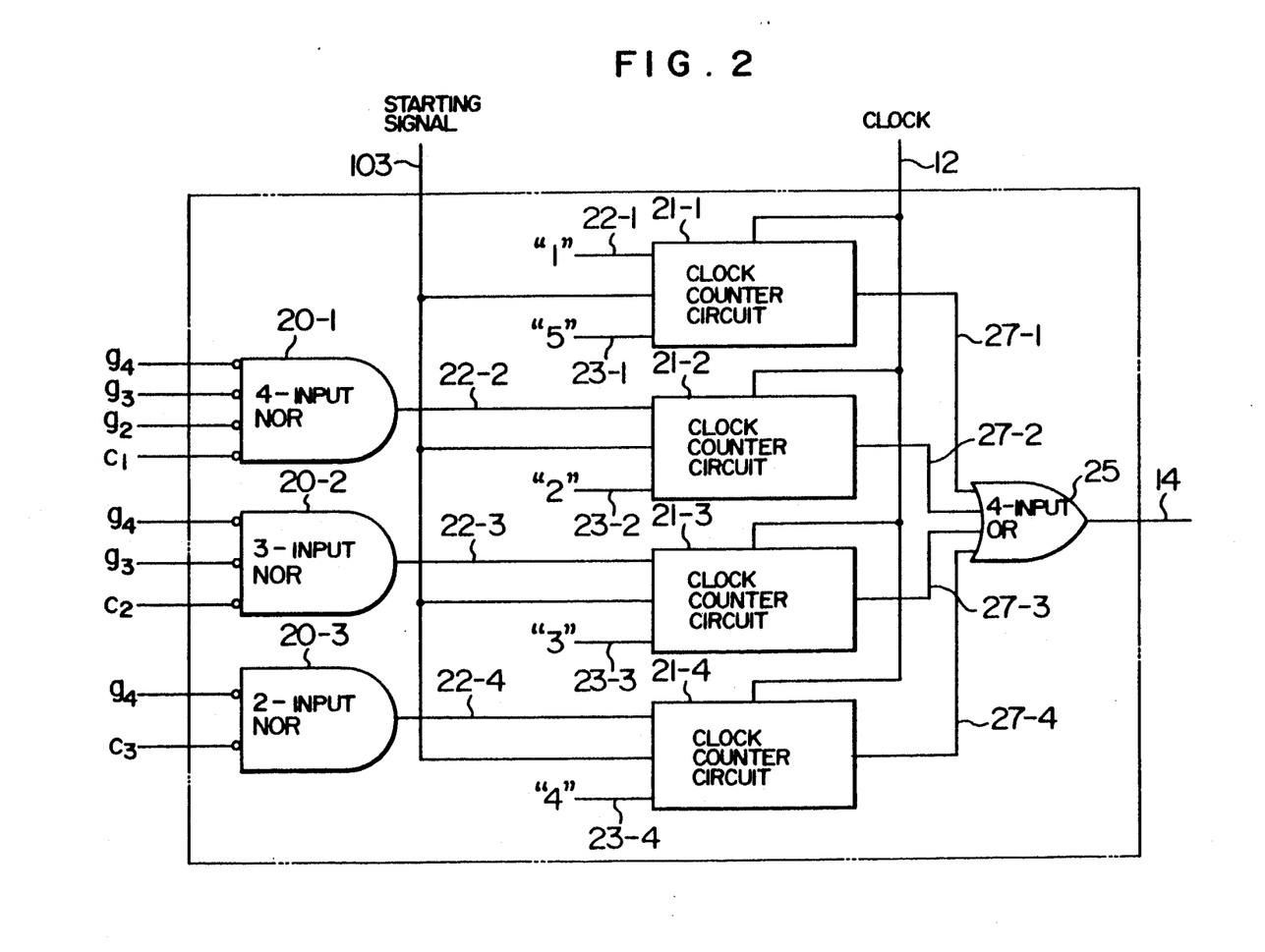
FIG. 2 is a detailed arrangement of an output timing control circuit of the preferred embodiments.

FIG. 2 represents a detailed construction of the above-described output timing control circuit 13. This circuit 20-1, a 3-input NOR circuit is arra-hged by a 4-input NOR circuit 20-2, a 2-input NOR circuit 20-3, clock counter circuits 21 (21-1 to 21-4), and a 4-input OR circuit 25.

The clock counter 21-1 has as inputs, a clock 12, a 1-bit signal 22-1, a 3-bit counter instruction signal 23-1, and a starting signal (an addition process starting signal) 103 (will be discussed later), and has as an output a 1-bit signal 27-1. This clock counter circuit 21-1 defines as a first cycle, a cycle starting when the clock 12 rises under such a condition that the starting signal 103 is asserted, outputs a 1-bit output signal 27-1 having a value of the 1-bit signal 22-1 at a time instant where the clock pulse of the cycle indicated by the above-described 3-bit counter instruction signal 23-1 rises and continues to hold this value during the remainder of this cycle, and furthermore outputs a value "0" to the 1-bit output signal 25-1 during a time instant other than the above-described time.

As a consequence, the clock counter circuit 21-1 outputs the value of the 1-bit signal 22-1, namely "1" to the 1-bit output signal 27-1 at the time instant where the clock fifth pulse rises. Similarly, the clock counter circuit 21-2 outputs a value of a 1-bit signal 22-2 to a 1-bit output signal 27-2 at a time instant where the clock of the second cycle rises. The clock counter 21-3 outputs a value of a 1-bit signal 22-3 to a 1-bit signal 27-3 at a time instant where the clock of the third cycle rises. The clock counter circuit 21-4 outputs a value of a 1-bit signal 22-4 to a 1-bit output signal 27-4 at a time instant where the clock of the fourth cycle rises.

In the 4-input NOR circuit 20-1, when all of the inputs $g_4, g_3, g_2$ and $C_1$ are "0", a value of a 1-bit signal 22-2 is equal to "1". In the 3-input NOR circuit 20-2, when all of the inputs $g_4, g_3$ and $C_2$ are "0", a value of the 1-bit signal 22-3 is equal to 1. Also, in the 2-input NOR circuit 20-3, when all of the inputs $g_4$ and $C_3$ are "0", a value of a 1-bit signal 22-4 is equal to "1".

The 4-input OR circuit 25 OR-gates four inputs 27-1 to 27-4 and produces the above-described valid signal 14 as an output. Accordingly, the valid signal 14 outputs "0" in the first cycle, the value of the 1-bit signal 22-2 in the second cycle, the output of the 1-bit signal 22-3 in the third cycle, the value of the 1-bit signal 22-4 in namely, "1" in the fifth cycle.

In accordance with the output timing control circuit 13 of the above-described preferred embodiment, the valid signal 14 can be produced by combining the clock counter circuits 21 (21-1 to 21-4) and the logic circuit. The above-described preferred embodiment employing this has the following advantages. That is to say, when $C_{j-1}$ becomes 0, gi (note: all of $i \geq j$) becomes 0, and Ci (note: all of $i \geq j$) becomes 0 inductively, although originally the process must be continued until the clock of the fifth cycle rises, the process can now be stopped at a time instant where the clock of the j-th cycle rises and the values $z_4$, $z_3$, $z_2$ and $z_1$ have been defined as the values of $Z_4$, $Z_3$, $Z_2$ and $Z_1$ with respect to the added result Z.

Figure 3:
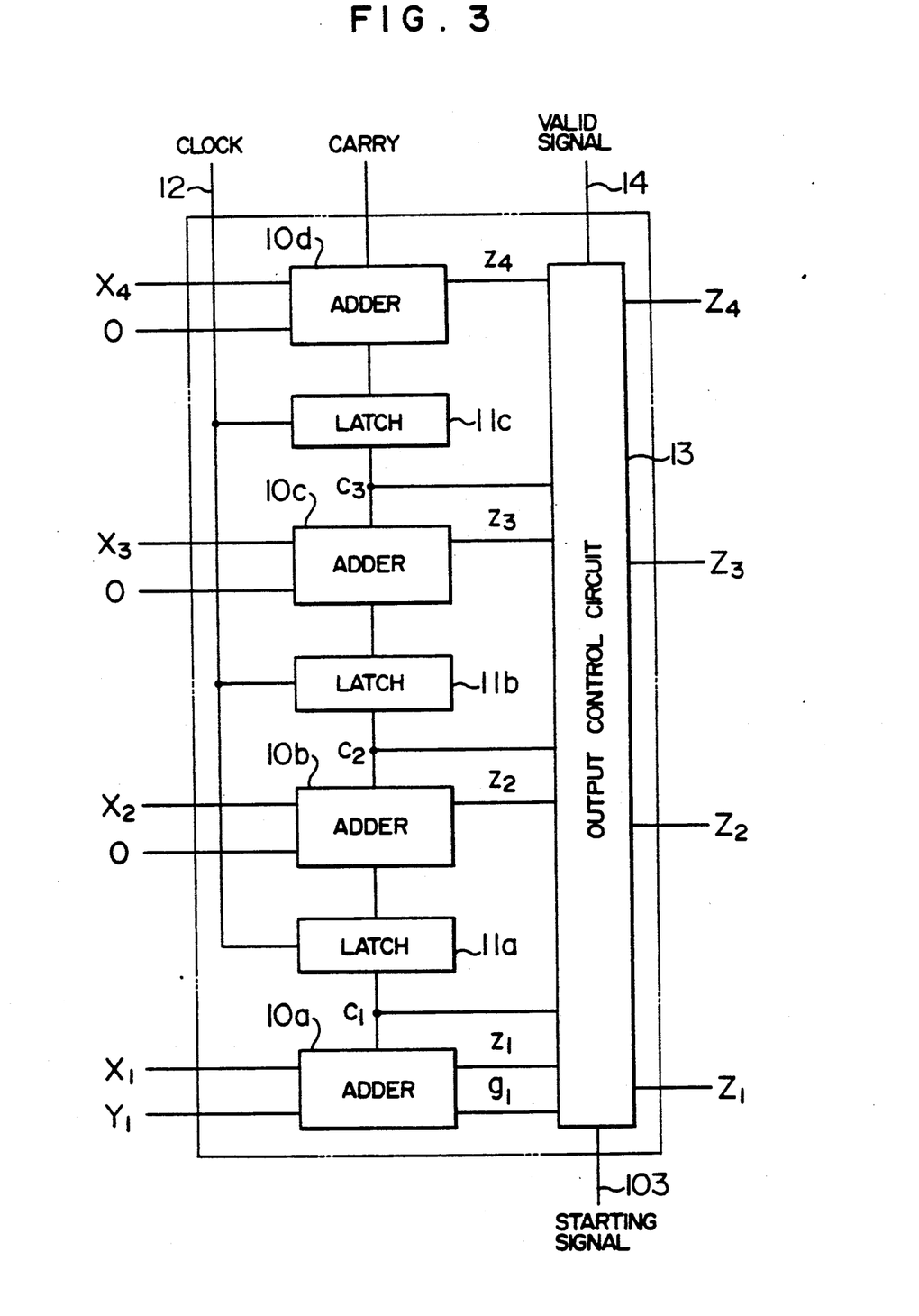
FIG. 3 is a schematic block diagram for showing an arrangement of an adder according to another preferred embodiment of the present invention.

FIG. 3 represents a second preferred embodiment of the present invention, and is a schematic block diagram of an adder into which a 64-bit number X and a 16-bit number Y are inputted, and from which a 64-bit number Z is output.

The adder according to the this preferred embodiment is constructed of four 16-bit full adders $10a$ to $10d$, three latches $11a$ to $11c$ under control of a clock signal 12, and an output timing control circuit 13. This adder subdivides the 64-bit number X into 16-bit numbers $X_4$, $X_3$, $X_2$ and $X_1$ which are processed in a unit of 16 bits by the adders $10d$, $10c$, $10b$ and $10a$.

The transfer of carry signals $C_1$, $C_2$ and $C_3$ among the adders $10d$, $10c$, $10b$ and $10a$ is controlled by the three latches $11a$, $11b$ and $11c$ under the control of the clock signal 12. In other words, in response to the rising edge of the clock, the values of the carries which have been inputted into the latches are held at the output side until the next rising edge of the clock. The values of the three latches $11a$, $11b$ and $11c$ are set to "0" when the clock edge of the first cycle rises at which time the addition process is commenced. Then, inputs $X_4$, $X_3$, $X_2$, $X_1$ and Y become effective values, the addition processes are commenced at the respective adders $10d$, $10c$, $10b$ and $10a$, and the values of $z_4$, $z_3$, $z_2$, $z_1$, $g_1$, $C_1$, $C_2$ and $C_3$ are fixed until the next clock edge rises. It should be noted that $Z_i$ is equal to an exclusive OR-gated value of $X_i$, $Y_i$ and $C_{i-1}$, whereas gi is equal to an AND-gated value of Xi and Yi. The transfer of the carry signals $C_1$, $C_2$ and $C_3$ are controlled by the three latches $11a$, $11b$ and $11c$ under the control of the clock signal 12, so that the value of $C_{i-1}$ is fixed as a value for the inputs X and Y until the clock of the i-th cycle rises. As a result, zi is fixed as a value for the inputs X and Y until the edge of the clock of the (i+1)-th cycle rises.

As previously described, when $C_{i-1}$ is equal to "0" and gi (note: all of $i \geq j$) is equal to "0", Ci (note: all of $i \geq j$) becomes "0" inductively. As a consequence, at this time instant, the values of $z_4$, $z_3$, $z_2$ and $z_1$, at the instant of time of the j-th cycle rising clock edge, have been fixed as the values of $Z_4$, $Z_3$, $Z_2$ and $Z_1$ with respect to the added result Z for the input X and Y. Thus, it is not necessary to continue the process until the rising clock edge of the fifth cycle. As previously stated, the valid signal 14 represents that the above-described values of $z_4$, $z_3$, $z_2$ and $z_1$ have been fixed as the values of $Z_4$, $Z_3$, $Z_2$ and $Z_1$ with respect to the added result Z for the input X and Y. The output timing control circuit 13 produces the valid signal 14 based upon $g_4$, $g_3$, $g_2$, $g_1$ and $C_1$, $C_2$, $C_3$.

The second preferred embodiment has the following advantage. That is to say, when $C_{j-1}$ is equal to "0", gi (note: all of $i \geq j$) becomes "0" and Ci (note: all of $i \geq j$) becomes "0" inductively, although the process must be otherwise continued until the rising clock edge of the fifth cycle, the process can be stopped on the rising clock edge of the j-th cycle at which time the values of $z_4$, $z_3$, $z_2$, $z_1$ have been defined as the values of $Z_4$, $Z_3$, $Z_2$ and $Z_1$ with respect to the added result Z for the inputs X and Y.

Figure 4:
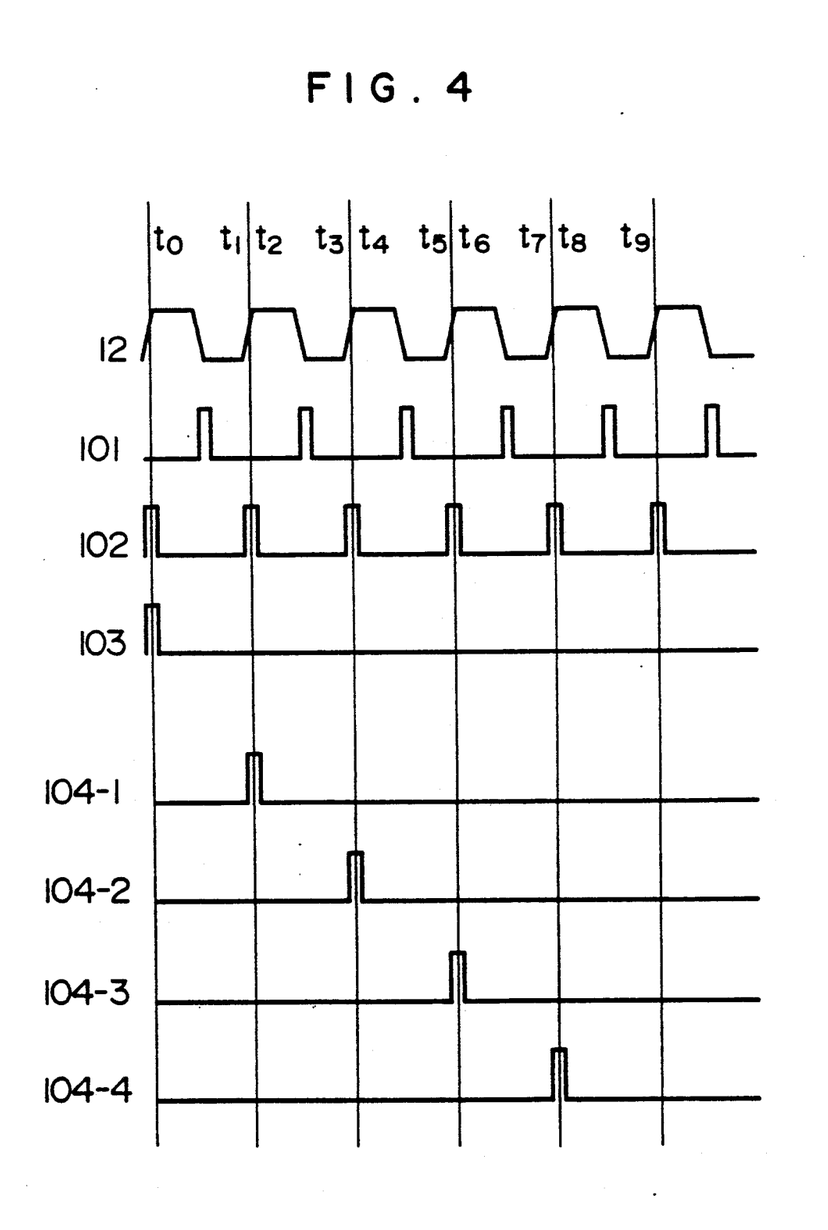
FIG. 4 is a timing chart of the control signal in the preferred embodiments.

FIG. 4 is a timing chart of the control signals employed in the above-described preferred embodiments. A clock signal 12 corresponds to a reference signal for synchronizing the operation of the adder shown in FIG. 1, based upon which various control signals are produced. Each of the adder circuits for constituting the adder represented in FIG. 1 performs an addition process when the clock signal 12 becomes "L" (low) ($t_1$, $t_3$, $t_7$, $t_9$) In other words the respective adder circuits commence the addition process based upon the inputs X(i), Y(i) and C(i) to the respective adder circuits which are fixed when the clock signal 12 falls, and carry out the addition processes until the clocks signal 12 rises, whereby the outputs C and Z(i) from the respective adder circuits are defined.

An adder input control signal 101 corresponds to a pulse signal which becomes "H" (high) when the clock signal 12 falls. When this adder input control signal 101 is equal to "H", the data at the inputs of the respective adder circuits are defined as the inputs, and are held while the respective adder circuits perform the addition processes. That is to say, when the adder input control circuit 101 becomes "H", each of the adder circuits starts its addition process.

A carry transfer signal 102 corresponds to a pulse signal which becomes "H" when the clock signal 12 rises, and controls the latches employed between the respective adder circuits. At a time instant at which this carry transfer signal 102 becomes "H", the respective adder circuits for constituting the adder according to the previous preferred embodiments have accomplished the addition processes, and the outputs thereof and carries thereof have been fixed. When the carry transfer signal 102 becomes "H", it is regarded that the values of the carries outputted from the respective adder circuits have been fixed, and the latches employed between the respective adder circuits continue to hold the above-described values while the carry transfer signal 102 is "L", namely while the respective adder circuits perform the addition process until the carry transfer signal 102 will become "H" at the next time.

The starting signal (addition process starting signal) 103 is to control a commencement of the addition process of the adders shown in the above-described preferred embodiments, and is such a pulse signal that it becomes "H" at the first cycle during which the addition process is commenced, namely at the rising edge at "$t_0$" of the clock signal 12. When the starting pulse 103 becomes "H", the latches provided among the respective adders are reset to the value "0" is set. Also the clock counter circuit 21 (will be discussed later) is reset. Furthermore the data at the adder inputs is regarded as the effective, or valid, and the data is inputted at this time instant into the adder. The adder commences the addition process based upon this data.

An addition process ending signal 104 (104-1 to 104-4) represents that the adder shown in the above-described preferred embodiment has accomplished the addition process, is generated by OR-gating the valid signal 14 shown in FIG. 2 and the carry propagate signal 102, and furthermore asserted when the ending conditions as described for FIG. 1 are satisfied.

In other words, when at the rising time of the clock in the second cycle ($t_2$ to $t_3$), namely at the rising time of "$t_2$", $C_1$ is equal to "0" and also $g_1$, $g_2$ and $g_3$ are equal to "0", the addition process ending signal 104-1 represents that the adder represented in the above-described preferred embodiment has accomplished the addition process at the rising time of the clock (i.e., the rising time of "$t_2$") in the second cycle. Similarly, when $C_2$ is equal to "0", and $g_2$ and $g_3$ become "0" at the rising edge of the clock in the third cycle ($t_4$ to $t_5$), namely at the rising edge of $t_4$, the addition process ending signal 104-2 indicates that the adder shown in the above-described preferred embodiment has completed the addition process at the rising edge of the clock in the third cycle (at the rising time of "$t_4$"). Also, when $C_3$ is equal to "0" and $g_3$ is equal to "0" at the rising time of the clock in the fourth cycle, namely at the rising edge of "$t_6$", the addition process ending signal 104-3 represents that the adder shown in the above-described preferred embodiment has completed the addition process at the rising time of the clock in the fourth cycle, namely at the rising time of "$t_6$". At the rising time of the clock in the fifth cycle, namely at the rising time of "$t_8$", the adder represented in the above-described preferred embodiment has necessarily completed the addition process, and the addition process ending signal 104-4 represents that the adder shown in this preferred embodiment has accomplished the addition process.

In the adder control method represented in the above-described preferred embodiments, two n-bit numbers X and Y are inputted as input signals, which are subdivided into a plurality of portions constructed of n(i)-bit X(i) and Y(i) (note: $i > 0$, and LSB is contained in X(1), Y(1)). A full addition process is implemented by X(i), Y(i) and C(i−1) (note: C(0)=0) so as to produce a result Z(i) and a carry bit C(i). In the adder for outputting the n-bit number Z which is concatenation of all of Z(i) as a result, both the exclusive OR-gating operation and AND-gating operation executed in the first cycle with respect to all of X(i) and Y(i). The resultant data are defined as Z(i) and g(i). Simultaneously, assuming now that Z(1)=z(1) and C(1)=g(1), both Z(i) and C(i) are determined from z(i), g(i) and C(i−1) during the i-th cycle. With respect to all of $i \geq j$, when the carry bit C(i) is equal to "0", Z(i) is equal to z(i) (note: $i > j$) in the (j+1)-th cycle and all of Z(i) are concatenated with each other so as to output the n-bit number Z, so that this n-bit number Z is defined as the value of the result and thus no error operation occurs.

Furthermore, the latch is interposed between the output of the carry bit C(i) from the adder circuit for performing the full adder operation to all of the abovedescribed n(i)-bit numbers X(i) and Y(i), and the input of the carry bit C(i) from the adder circuit for performing the full adder operation on the X(i+1) and Y(i+1), this latch is controlled in response to the above-described clock. As a result, since the carry propagation is under control of the clock, no error operation is caused. In addition, with respect to an arbitrary "j", the AND-gated X(i)Y(i) for all of $i > j$ are equal to "0" and C(i) is equal to "0", the control signal represents that the process of the adder is ended and the resultant value Z has been fixed. As a consequence, with respect to the computation of Z(i) to which a carry gives an influence in a computation since z(i) becomes Z(i), no error operation occurs. Also, with respect to a certain "j", an input is restricted such that Y(i) is equal to "0" for all of $i > j$, and the carry bit C(i) is equal to "0" with respect to the above-described all of $i \geq j$, the control signal indicates that the addition process is ended and the resultant value Z has been fixed. Then, z(i) is equal to Z(i) with regard to Z(i) to which a carry gives an influence in the computation, so that no error operation occurs.

It should be noted that the present invention may be applied to updating operations of a program counter and a stack pointer. That is to say, the present invention may be applied when: assuming values for representing the program counter and a byte length of an instruction are used as an input for an adder, and an address of a next instruction is used as an output thereof; or values for indicating a stack pointer value and a byte length as a length of entry of the stack are employed as an input for an adder, and an address of a next or preceding entry is employed as an output thereof.

As previously described in detail, in accordance with the present invention, there are the following particular advantages. There is a period for each full adder divided portion required during which both the n(i)-bit numbers X(i), Y(i) and carry bit C(i−1) have been inputted, both the result Z(i) and carry bit C(i) are produced, and the carry bit C(i) is outputted to the adjoining adder. The processes of the respective adders are controlled in such a manner that the longest time period among the time periods for the plurality of divided portions is determined as the time period of the clock. It is possible to control such an adder to prevent that the adder contains the critical path and thus, the time period of the clock for controlling the computer system is expanded when the number of the bits of the data and address in the computer system will be expanded.

Furthermore, by implementing the addition process for updating the program counter and also the stack pointer by way of the above-described adder control method, it is also possible to realize such an adder control method, other than the usual adder process operation, capable of omitting a waste of time required in the conventional method during the addition process, taking account of such characteristics of the program that one of two input data in the updating of the program counter, of the stack pointer, in the addition Process is equal to the value presentable by a less bit number.

We claim:

1. An adder control method for an adder comprising a plurality of full addres, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder;

said adding including exclusive OR-gating to obtain z(i), AND-gating to obtain g(i), and OR-gating to obtain C(i) with respect to said n(i)-bit values X(i) and Y(i) in a first operation cycle; when $Z(1)=z(1)$ and $C(1)=g(1)$, z(i) and C(i−1) are exclusive OR-gated to obtain Z(i), and both AND-gated C(i−1) and p(i) and said AND gated value g(i) are OR-gated to obtain C(i) in a j-th cycle; and when the carry bit C(i) is equal to "0"]with respect to all of $i \geqq j$ in a certain j cycle, $Z(i)=z(i)$ (where $i > j$) in a (j+1)-th cycle, the step of adding is terminated and all of Z(i) are concatenated so as to output the result value Z as an output of the adder.

2. An adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder;

said adding including interposing a latch between an output of the carry bit C(i) of a full adder for performing a full adder operation on the values X(i) and Y(i), and an input of said carry bit C(i) of a full adder for performing a full adder operation on X(i+1) and Y(i+1); and controlling the latch in response to the adder clock.

3. A method of controlling a computer that generates an address with the adder, including an adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder;

wherein said step of controlling generates an adder control signal when Y(i) is equal to "0" with respect to all of $i>j$ and the carry bit C(i) is equal to "0" with respect to all of said $i \geqq j$, for controlling said adding for producing the result Z as the address.

4. A method of controlling a computer having a program counter, instruction at addresses, an instruction with a byte value for changing the value of the program counter, and an adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder; wherein both a program counter value and a value representative of a byte length of an instruction correspond to each of the values X and Y, and said n-bit result Z is output as an address of a subsequent instruction.

5. A method of controlling a computer having a stack and that generates an address with an adder, including an adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder; wherein said step of inputting inputs both a stack pointer value and a value indicative of a length of entry of the stack as a byte length corresponding respectively to each of the values X and Y, and said step of concatenating outputs the value Z as an address of a predetermined entry.

6. An adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder; and changing the number of clock time periods within the adder time period in response to the bit length of at least one of the two values X and Y; so that the adder time period may be reduced from a previous adder time period when at least one of the two values X,Y is of less bit length than the shortest bit length of the two values X and Y of a preceding addition.

7. An adder control method as claimed in claim 6, wherein said step of dividing divides the two values X and Y into the plurality of portions constructed of X(i) and Y(i) which are equal in number of bits with each other.

8. An adder control method as claimed in claim 6, wherein said step of controlling, generates an adder control signal when the carry bit C(i) is equal to "0" with respect to all of $i \geq j$, AND-gated X(i) and Y(i) are equal to "0" with respect to all of $i > j$ and also C(j) is equal to "0", for controlling the process of the adder.

9. An adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i)

and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder;and changing the number of clock time periods within the adder time period in accordance with the value of an output carry from at least one of the full adders other than the first full adder for the LSB; so that the adder time period may be shortened by an integer multiple of the clock time period from an adder time period equal to the number of full adders multiplied times the clock time period as soon as a true addition result for the adder is reached.

10. An adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder; and changing the number of clock time periods within the adder time period in accordance with the logical AND of the n (i) - bit values X (i), Y (i) of at least the MSB adder, so that the adder time period may be shortened by an integer multiple of the clock time period from an adder time period equal to the number of full adders multiplied times the clock time period as soon as a true addition result for the adder is reached.

11. An adder control method according to claim 10, wherein said changing is further in accordance with the value of an output carry from at least one of the full adders other than the first full adder for the LSB so that the adder time period may be shortened by an integer multiple of the clock time period from an adder time period equal to the number of full adders multiplied times the clock time period as soon as a true addition result for the adder is reached.

12. An adder control method for an adder comprising a plurality of full adders, each full adder having value and carry inputs as well as result and carry outputs, comprising the steps of:

inputting two values X and Y to the adder;

dividing each of the two values X and Y into a plurality of portions, each portion constructed of n (i) - bit values X (i) and Y (i) where is is an integer greater than 1 and the LSB is contained in X (1) and Y(1);

arranging the full adders in a ripple-carry arrangement so that each full adder receives as an input the carry bit of the preceding adder, except for the first full adder that has an input carrier bit of zero;

adding in respective full adders each of the n (i) - bit values X (i), Y (i) and a carry bit C (i−1) from the preceding full adder so as to produce a result Z (i) and a carry bit C (i) at the respective outputs of the full adders;

concatenating all of the results z (i) to produce a result value Z;

providing an adder clock having a clock time period substantially equal to the longest time period required for each of the full adders to input the n (i) - bit values X (i) and Y (i), input the carry bit C (i−1), produce the result z (i), produce the carry bit C (i), output the result z (i) and ripple propagate the carried out C (i) to the next full adder;

controlling each of the full adders to complete addition of the values X (i) and Y (i) and a carry (i−1) at their input and produce addition results Z (i) and carries C (i) at their outputs within a continuous plurality of clock time periods of the adder clock constituting an adder time period for the completion of the addition of the values X and Y within the adder.

13. An adder control method according to claim 12, including changing the number of clock time periods within the adder time period in accordance with the value of an output carry from at least one of the full adders other than the first full adder for the LSB.

14. An adder control method according to claim 12, including changing the number of clock time periods within the adder time period in dependence on at least one of the inputs, the outputs and results of said step of adding so that the adder time period may be shortened by an integer multiple of the clock time period from an adder time period equal to the number of full adders multiplied times the clock time period as soon as a true addition result for the adder is reached.

15. An adder control method according to claim 14, wherein said step of controlling includes logical NORing the carry result C1 of the full adder adding the LSB of the values X, Y, and results of said step of adding in at least two other full adders successively in the chain of the ripple arrangement for the first clock time period for outputting a control signal for ending the addition process of the adder with a valid result prior to the result carry of the LSB full adder rippling through all of the full adders.

16. An adder control method according ot claim 15, wherein said step of controlling further includes logical NORing the carry output of the full adder following the LSB full adder in the ripple arrangement with result of said step of adding in all of the subsequent full adders in the ripple arrangement to produce a control signal for terminating the addition within the adder prior to the output carry of the LSB full adder rippling through all of the full adders when a valid result is reached.

* * * * *